United States Patent [19]

Wolf

[11] Patent Number: 5,036,910
[45] Date of Patent: Aug. 6, 1991

[54] COMBINATION RADIATOR AND CONDENSER APPARATUS FOR MOTOR VEHICLE

[75] Inventor: Peter G. Wolf, Tonawanda, N.Y.

[73] Assignee: General Motors Corporation, Detroit, Mich.

[21] Appl. No.: 536,814

[22] Filed: Jun. 12, 1990

[51] Int. Cl.⁵ .............................................. F28D 7/10
[52] U.S. Cl. ..................................... 165/140; 62/507; 165/153
[58] Field of Search .................. 62/507; 165/140, 164, 165/153

[56] References Cited

U.S. PATENT DOCUMENTS

| | | | |
|---|---|---|---|
| 1,701,617 | 2/1929 | Hyde | 165/140 |
| 1,823,919 | 9/1931 | Smith | 165/140 |
| 1,840,588 | 1/1932 | Knox | 165/140 X |
| 2,175,126 | 10/1939 | McCormick | 165/140 X |
| 2,521,040 | 9/1950 | Casetta | 165/140 X |
| 2,621,903 | 12/1952 | Cohler | 165/140 X |
| 3,447,596 | 6/1969 | Hughes | 165/42 |
| 3,486,489 | 12/1969 | Huggins | 165/140 X |
| 4,138,857 | 2/1979 | Dankowski | 62/243 X |

*Primary Examiner*—William E. Tapolcai
*Attorney, Agent, or Firm*—Ronald L. Phillips

[57] ABSTRACT

A combination radiator and condenser apparatus for a motor vehicle has inlets and outlets adapted to be connected in both a coolant system for a liquid cooled engine and in a refrigerant system of an automobile air conditioning system. The apparatus includes a plurality of axially aligned fluid flow tubes having the same air centers and the tubes each extend between combination radiator and condenser tanks, in one embodiment the axially aligned fluid flow tubes are unitary, integral fluid flow tubes with a separate refrigerant vapor passage and a separate engine coolant passage therein. A method for simultaneously cooling engine coolant and refrigerant vapor in combined radiator and condenser apparatus for a motor vehicle includes the steps of directing vehicle inlet airstream through common air centers between the axially aligned refrigerant vapor tubes and vehicle coolant tubes.

4 Claims, 3 Drawing Sheets

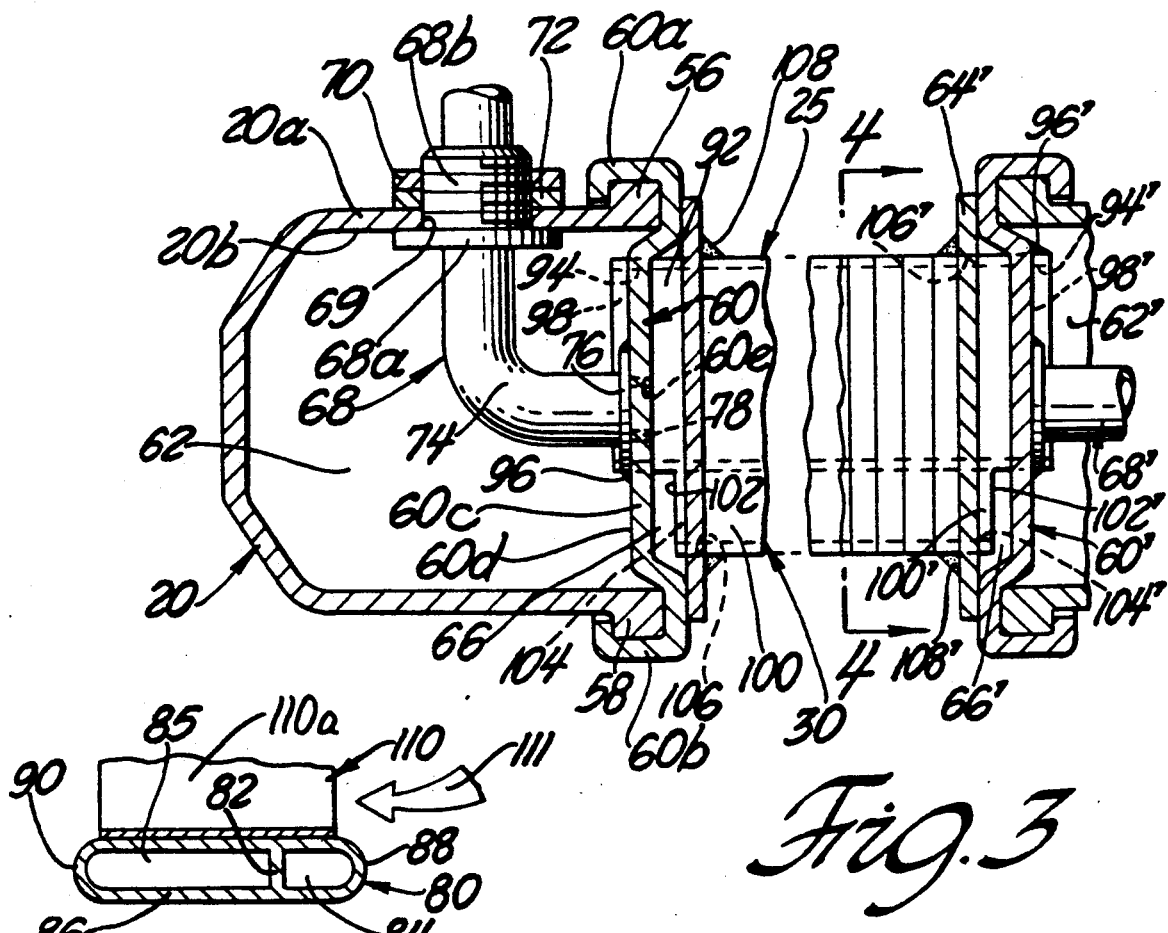
Fig.3
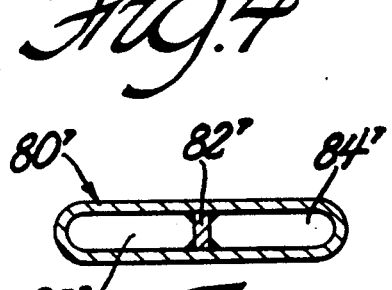
Fig.4
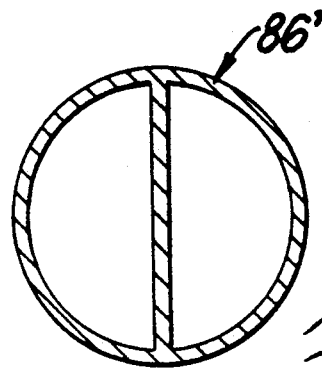
Fig.5
Fig.6
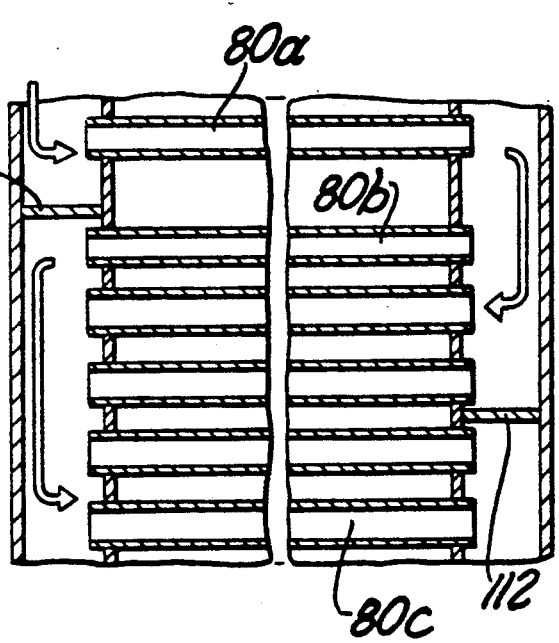
Fig.7

5,036,910

COMBINATION RADIATOR AND CONDENSER APPARATUS FOR MOTOR VEHICLE

FIELD OF THE INVENTION

This invention relates to a method for cooling engine coolant and refrigerant vapor in a motor vehicle having a liquid cooled engine and an air conditioning system and further to radiator apparatus having parallel tube passes and more particularly to radiator apparatus of the type having air centers for directing the inlet air stream of the vehicle through separate tube passes in separate radiator and condenser portions of the combination radiator and condenser apparatus.

BACKGROUND OF THE INVENTION

In motor vehicle cooling systems for cooling engine coolant, refrigerant vapor and engine oil it has been desirable to locate either an oil cooler or a refrigerant condenser unit at a location upstream of the inlet surface of the radiator for removing heat from the coolant system for an liquid cooled engine. Examples of such systems are setforth in U.S. Pat. Nos. 3,479,834 and 4,138,857.

Such location exposes the tube passes of the refrigerant condenser and/or oil cooler to ram air flow as the vehicle is driven in a forward direction. Furthermore, such location causes the engine fan to draw cooling air across the condenser while the vehicle is stopped or slow moving and the engine is idling. As a consequence the condenser is operative to condense refrigerant gas to a liquid which is then directed across an expansion valve for controlling the flow of refrigerant into a refrigerant evaporator. A circulating fan draws air flow across the evaporator for cooling the interior or passenger compartment of a motor vehicle in a known manner. Likewise a continual flow of cooling air is directed across the oil cooler.

While the forward or upstream location of the refrigerant condenser is a favorable location for providing continual air flow across the tube passes of the condenser and/or oil cooler, such refrigerant condensers and/or oil coolers have separate air centers and the radiator has separate air centers which can cause undesirable contraction, expansion, contraction cycles in the inlet airstream for cooling the separate components of combination radiator and condenser apparatus for motor vehicles. Such pressure cycles in the inlet airstream result in an increased pressure drop that will reduce the cooling effectiveness of the inlet airstream of the vehicle.

In the past such reduction in cooling effectiveness has been compensated by providing a slightly oversized frontal area in the radiator or the condenser could be located laterally of he radiator so as not to retard air flow therethrough. An example of a laterally offset condenser is set forth in U.S. Pat. No. 3,447,596.

Present vehicle design constraints have reduced the available space for such oversized radiators or for such offset condenser configurations.

Additionally, in future automobile air conditioning systems high cost alternative refrigerants are being proposed. In order to minimize the amount of such refrigerant required to effectively cool a vehicle engine compartment it will be desirable to reduce the size of the condenser to reduce the total volume of refrigerant in the system but without reducing the cooling capacity of the condenser.

In order to avoid such design constraints an object of the present invention is to provide a combined radiator and condenser apparatus wherein the tube passes of both the radiator and the condenser have the same air centers for defining a single air flow path through both the radiator and the condenser which will not increase the pressure drop across the radiator and condenser as the inlet airstream of a motor vehicle is directed thereacross.

In prior combination radiator and condenser apparatus no solution has been proposed which will enable a condenser and a radiator to be located in limited space confines of a motor vehicle without adversely affecting the flow of coolant air flow across one or both of the separate condenser and radiator units.

SUMMARY OF THE INVENTION

Accordingly, one feature of the present invention is a combination radiator and condenser apparatus in which a single set of air centers is provided for cooling both the radiator and the condenser as an inlet airstream of a vehicle is directed thereacross.

Another feature of the present invention is to provide a combination radiator and condenser apparatus in which a plurality of unitary tube passes are arranged to have both coolant flow and refrigerant flow therethrough both of which flow patterns are cooled by air flow across a single set of air centers which are common to both the radiator and the condenser and which have substantially the same frontal flow area for receiving inlet air stream of the vehicle without causing increases in pressure drop by contraction, expansion and contraction pressure cycles in the inlet air stream of the vehicle.

Still another feature of the present invention is a combination radiator and condenser apparatus for a motor vehicle having a liquid cooled engine and an engine driven compressor in a refrigerant system for the vehicle in which high pressure refrigerant vapor from the compressor discharge is cooled by the condenser and coolant for the engine is cooled by the radiator and in which shared common unitary tube passes are provided having both coolant and refrigerant passages.

Another object of the present invention is to provide a simplified unitary combination radiator and condenser apparatus having a single set of air centers for simultaneously air cooling refrigerant gas and coolant liquid flow without increasing pressure drop thereacross caused by contraction, expansion and contraction pressure cycles in the inlet airstream of the vehicle as it is directed through air centers for cooling the tube passes of the apparatus.

A further object of the present invention is to provide for combination apparatus as set forth in the preceding object in which tube passes are connected to the same air centers and wherein tube passes are formed with axially aligned condenser tube segments and radiator tube segments having passages for flow of refrigerant vapor and a passage for flow of engine coolant and wherein each of flows are cooled by flow of the inlet air stream of the vehicle through the same air centers.

A further object of the present invention is to provide the combined apparatus of the preceding object wherein the tube passes are unitary tubes having both refrigerant flow and coolant flow through each of the unitary tubes.

A further object of the present invention is to provide the combined apparatus of the preceding object in which the unitary tube passes have an integral divider web therein forming first and second passages.

A further object of the invention is to provide a combination radiator and condenser apparatus for motor vehicles having unitary tubes with the same air centers and wherein the unitary tubes have an integral divider web therein forming separate refrigerant flow and coolant flow passages.

A further object of the present invention is to provide an extension on the end of each of a plurality of tube passes for communication of spaced coolant and refrigerant passages therein with either a coolant tank or a refrigerant vapor return header space by the provision of an extension on the end of the tube passes for forming an inlet to the coolant passage; and by the further provision of a notch on the extension forming an inlet to the refrigerant passage.

Still another object of the present invention is to provide the combination radiator and condenser apparatus of the preceding objects wherein a closed coolant tank is provided including a first header plate; a second header plate having first portions thereon sealed to the first header plate and second portions thereon spaced from the first header plate to define a refrigerant vapor gas space therebetween fluidly sealed from the coolant radiator tank; and wherein a plurality of parallel unitary tube passes each have first and second passages for flow of separated fluid therethrough and each further having a tube end extension connected to the first header plate and extending therethrough in sealed relationship therewith into the coolant tank; an opening in the tube end extension communicating the coolant tank with the first passage; a notched end on each of the tube passes extending through the second header plate; the notched end having an inlet therein communicating the refrigerant vapor space with the second passage; each of the unitary tube passes extending through the second header plate and sealed relative thereto for directing vapor from the refrigerant vapor space for flow through the inlet in the notched end and through the second passage.

Another feature of the present invention is an improved method for cooling refrigerant vapor flow and engine coolant flow through parallel tube passes in a combined radiator and condenser apparatus for a motor vehicle comprising the steps of providing tube passes with a refrigerant flow path and a coolant flow path; conductively extracting heat simultaneously from the refrigerant flow path and the coolant flow path into a common air center element; and removing the conductively extracted heat from the common air center element by directing the inlet air stream of the vehicle therethrough.

Another feature is to provide such an improved method for combined cooling of refrigerant flow and engine coolant in a combination radiator and condenser apparatus for a motor vehicle by the additional step of locating the refrigerant flow path in the inlet air stream upstream of the coolant flow path and in axial alignment therewith.

Still another feature is to provide such an improved method for combined cooling of refrigerant flow and engine coolant in a combination radiator and condenser apparatus for a motor vehicle by a step of locating the refrigerant flow and coolant flow in a single tube element and conductively extracting heat by conductive heat transfer from the single tube element to a single air center element.

Further objects and advantages of the present invention will be apparent from the following description, reference being had to the accompanying drawings, wherein preferred embodiments of the present invention are clearly shown.

BRIEF DESCRIPTION OF THE DRAWINGS

FIG. 3 is an enlarged fragmentary view taken along the line 3—3 of FIG. 2 looking in the direction of the arrows;

FIG. 4 is an enlarged fragmentary sectional view taken along the line 4—4 of FIG. 3 looking in the direction of the arrows;

FIG. 5 and 6 are sectional views of other embodiments of unitary flow tubes for use in the FIG. 2 embodiment;

FIG. 7 is a diagrammatic view of another embodiment of the present invention for providing multi pass flow through the condenser portion of a combination radiator and condenser apparatus for a motor vehicle.

DETAILED DESCRIPTION OF PREFERRED EMBODIMENTS

Figure 1:
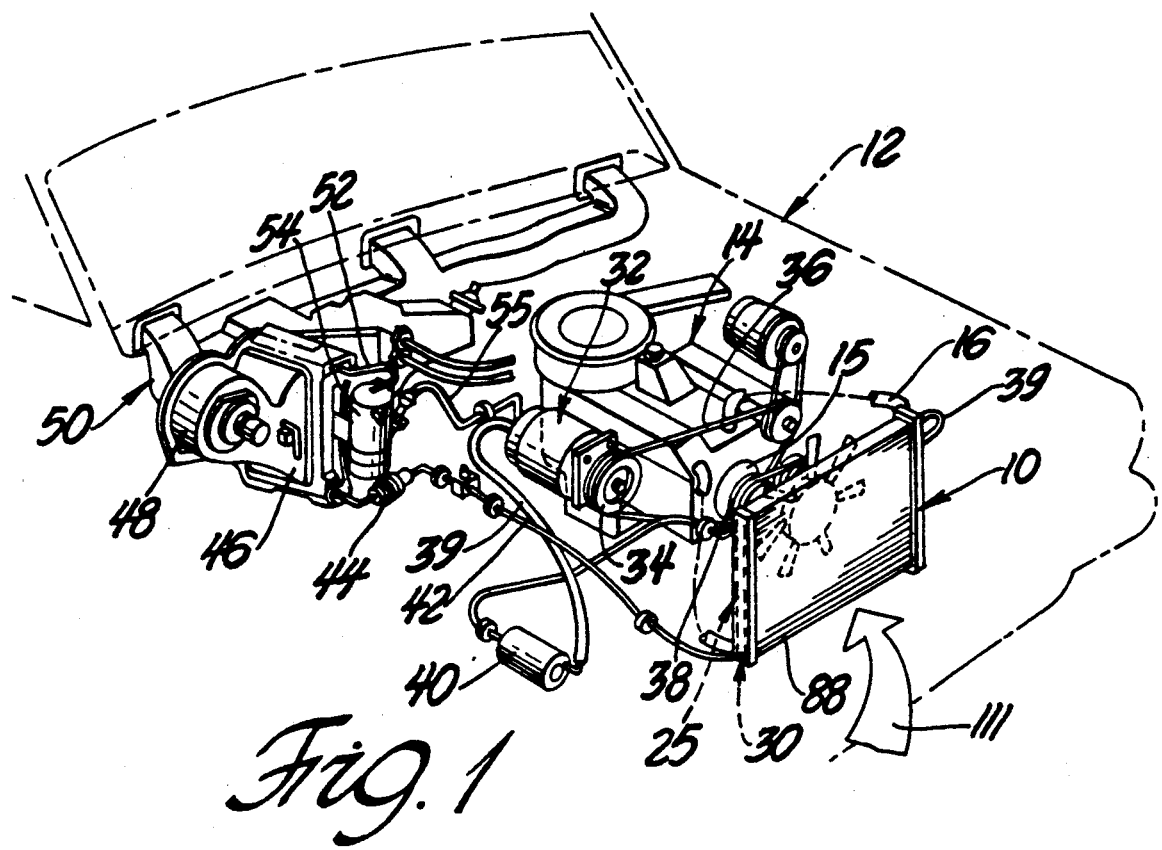
FIG. 1 is perspective view of an automobile coolant system and air conditioning system including the combination radiator and condenser apparatus of the present invention.

Referring now to FIG. 1, a combination radiator and condenser apparatus 10 of the present invention is shown installed in the engine compartment of a motor vehicle 12 having a liquid cooled engine 14. A coolant pump 15 on the engine 14 directs liquid from the coolant passages of the engine for discharge through a radiator hose 16 which connects to an inlet fitting 18 on a radiator inlet tank 20 of the assembly 10. An outlet radiator hose 22 connects to an outlet fitting 24 on an outlet tank 26 and to the coolant jacket inlet 27. A radiator section 25 of the apparatus 10 is provided between the tanks 20 and 26. The radiator section 25 has a frontal flow area for unrestricted flow of the air intake stream of the vehicle through the radiator section 25.

The combination apparatus 10 includes a condenser section 30 which is connected to the discharge of a refrigerant compressor 32. The compressor 32 is driven through an electromagnetic clutch 34 by a belt 36 driven from an engine pulley 38 during engine operation. The compressor 32 discharges refrigerant at high pressure and in gaseous vapor form through a discharge line 39 containing a muffler 40 to the condenser section 30. In accordance with the present invention the condenser section 30 has the same frontal flow area as that of the radiator section 25.

Further, according to one aspect of the present invention, the radiator section 25 and the condenser section 30 share the same air centers for preventing flow disturbances in the air intake stream of the vehicle across parallel tube passes and air centers therein to be described.

High pressure refrigerant vapor condenses in the condenser section 30 and the refrigerant exits the condenser section 30 at high pressure but in a liquid form through a high-pressure liquid line 42. The high-pressure liquid line 42 is connected to a flow restrictor valve assembly 44 installed immediately upstream of an evaporator 46. Air is drawn through the evaporator on the air side thereof by an electric motor driven blower 48 and is blown at a reduced temperature into the passenger compartment through a mode control duct system 50.

Low pressure refrigerant vapor exits the evaporator 46 through a suction line 52 having a accumulator dehydrator unit 54 and is thence returned via line 55 to the suction inlet of the compressor 32. The system thus far described is a conventional system but for the presence of the combined condenser and radiator assembly 10 of the present invention.

In the past the condenser for such refrigerant and air conditioning systems has been a separate unit either located in front of a rearwardly spaced separately manufactured radiator or laterally thereof. In prior art arrangements in which the condenser is mounted in front of a radiator, air centers in the radiator are spaced from the air centers in the condenser or the air centers of the radiator are located out of line with the air centers of the condensers. In either case such spacing or misalignment will cause increases in the pressure drop across the combined apparatus as the inlet air stream of the motor vehicle is directed therethrough.

More particularly, front mounted condensers cause the inlet air stream of the motor vehicle to contract in volume and increase in pressure as the inlet air stream is passed through the air centers of the condenser. Following passage through the condenser air centers the air stream volume expands and then it again contracts in volume as it enters the air centers of the downstream located radiator. Such volume contraction, volume expansion and volume contraction increases the pressure drop from the inlet side to the outlet of the combination apparatus 10 so as to reduce the cooling efficiency of the inlet air stream of the motor vehicle.

As will now be described in greater detail, the combination radiator and condenser apparatus 10 of the present invention solves such problems by being mounted on a common base and by having the same air centers transferring heat from the radiator and condenser as the inlet air stream of the motor vehicle passes thereacross. The use of a single common air center element for both the radiator section 25 and the condenser section 30 optimizes the cooling efficiency of the inlet air stream of the vehicle.

Figure 2:
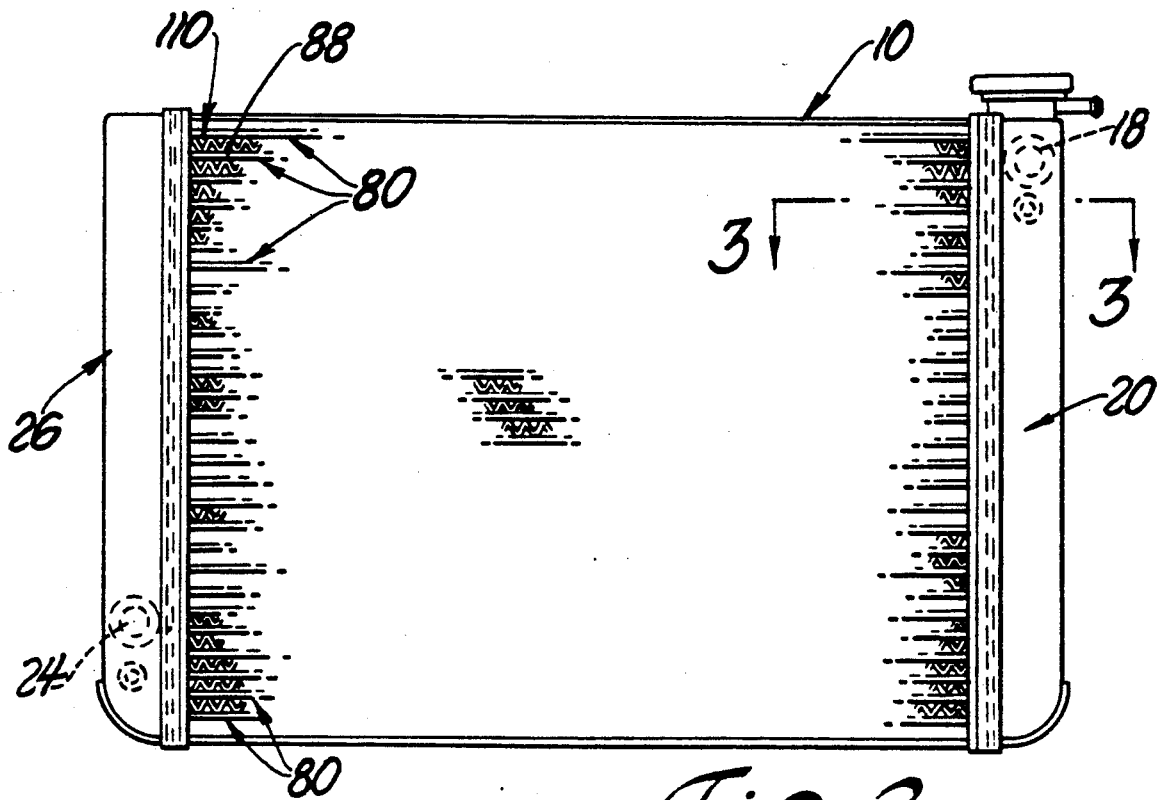
FIG. 2 is an enlarged front elevational view of the combination radiator and condenser apparatus of FIG. 1.

As shown in greater detail in FIGS. 2-4, the combination radiator and condenser apparatus 10 includes a radiator tank 20 formed with spaced, outwardly bent flanges 56, 58. The flanges are captured in bent edges 60a, 60b of a radiator header plate 60 to form a sealed interface therebetween which prevents leakage from a coolant chamber or space 62 which has coolant supplied thereto from the radiator inlet 18.

A second header plate 64 is sealingly connected to the underside of each of the bent edges 60a, 60b. The first header plate 60 has a raised central portion 60c which is spaced from the second header plate 64 to form a sealed refrigerant vapor space 66 therebetween. The sealed refrigerant vapor space 66 is connected to the discharge line 39 from the compressor 32 through a refrigerant fitting 68 directed through an access hole 69 in the rear wall 20a of the radiator tank 20. The fitting 68 has a radially outwardly directed retention ring 68a thereon that engages the inside surface 20b of the rear wall 20a. The fitting 68 includes an exterior threaded surface 68b thereon outboard of the rear wall 20a. A nut 70 threadably received on the fitting 68 holds a ring gasket 72 in sealing engagement around the access hole 69 to seal coolant in the coolant space 62. The refrigerant fitting 68 has a right angle bend 74 therein which terminates at an integral collar 76 and a small diameter tube extension 78. The collar 76 is brazed to the upper surface 60d of the first header plate 60 and the tube extension is directed through an access port 60e in the first header plate 60 so as to communicate the compressor discharge line 39 with the sealed refrigerant vapor space 66.

The outlet tank 26 has a like pair of first and second header plates 60' and 64' to form a like coolant space 62' and sealed gas space 66'. The coolant space 62' communicates with the return fitting 24 and the sealed gas space 66' is communicated by a fitting 68' identical to fitting 68 for connecting the sealed gas space 66' with the high pressure liquid refrigerant line 42.

Another aspect of the present invention is that the radiator inlet tank 20 and outlet tank 26 are interconnected by parallel tube passes comprised of unitary flow tubes 80 that serve as a common member for flow of both coolant and refrigerant between the coolant spaces 62, 62' and the sealed gas spaces 66, 66'. More particularly each of the unitary flow tubes 80 is preferably formed as a straight extruded tube having an integrally formed divider web 82 therein for separating the flow tubes 80 into a refrigerant vapor passage 84 and an engine coolant passage 85. The flow tubes 80 each have a generally oval cross-section bounded by a curved outer air flow surface 86 extending from a sharp radius leading edge 88 to a sharp radius curve trailing edge 90.

The refrigerant vapor passage 84 is located at the inlet edge 88 of the tube 80. The liquid passage 85 is located between the outlet edge 90 and the divider web 82.

In accordance with one aspect of the present invention each tube 80 has opposite end extensions 92 thereon which fit through holes 94, 94' in the first header plates where they are sealed by suitable means such as a brazed joint 96, 96. Additionally each of the end extensions have an opening 98, 98' for directing coolant into and out of each of the liquid passages 85.

In accordance with another aspect of the present invention each of the tubes 80 has a notched segment 100, 100' which includes an upper surface 102, 102' disposed within the refrigerant vapor space 66, 66' and including an end opening 104, 104' for directing refrigerant gas into and out of each of said gas passages 84.

The tubes 80 each extend through openings 106, 106' in the second header plates 64, 64' where they are sealed by suitable seal structure such as a brazed joint 108, 108.

One advantage of the present invention is that standard air centers 110 can be located in the space between each of the tubes 80 to define an air flow frontal pattern for the inlet airstream 111 of the vehicle which is not reduced or effected adversely by the condenser section 25 of the combination radiator and condenser assembly 10. The air centers 110 include a plurality of axial air passages 110a, one of which is shown in FIG. 4. The passages 110a are axially aligned with the airstream 111 and define one continuous uninterrupted axial air passage across the tubes to simultaneously remove heat from the refrigerant vapor in passage 84 and from the engine coolant in passage 85.

If no air conditioning is desired the only change required is the elimination of the notch section on each of the tubes, the elimination of the divider web 82 and the elimination of the fittings 68 and the second header plates 64, 64'. The resultant structure can be mounted in the same fashion in the inlet air stream of a vehicle and can include the same tube surface configuration with standard air centers therebetween.

Operation of the embodiment of FIGS. 1–4 includes directing either fan induced or ram jet air as inlet air stream flow against the leading edges 88 of the tubes 80. The inlet air stream is passed across the flow surface 86 and through the common air centers 110 which are bonded to the surface 86 for simultaneously removing heat by conductive heat transfer through the same air center element from both the radiator section 25 and the condenser section 30. In the case of the radiator section 25, heat is removed from the coolant being circulated through the passages 85 by flow of coolant from the radiator inlet hose 16, thence through the inlet fitting 18, the liquid space 62 thence into the outlet tank 26 at the liquid space 62'. From space 62' the return coolant passes through the outlet fitting 24 and the return radiator hose 22 to the coolant jacket inlet 27. Simultaneously, if the air conditioning is turned on the electromagnetic clutch 16 is energized by suitable control means of a conventional form well known in the art. The compressor 32 is thereby directly coupled to the engine output for compressing refrigerant vapor from the evaporator 46 and discharging the refrigerant vapor into the sealed refrigerant vapor space 66. The refrigerant vapor is then passed through the passages 82 where the vapor is cooled by direct conductive heat transfer to the common air centers 110 for extracting heat from the coolant in passages in passages 85.

The conductive heat transfer for both coolant and refrigerant is from the tubes 80 at the outer surface 86 which enclose the side surfaces of the refrigerant vapor passages 82 and the coolant passages 85. The conductive heat transfer causes the high pressure refrigerant vapor to cool and condense into high pressure liquid which is collected and expanded across the expansion valve 44 for cooling the air flow across the evaporator 46.

While the unitary flow tube 80 is shown as an extrusion with an integral divider wall as shown in FIG. 4, it can also be a sheet tube 80' having a divider insert 82' welded or otherwise secured therein to seal and separate a gas passage 84' from a liquid passage 85'. Also as shown in FIG. 6, the flow tube 80 can be shaped to have a circular outer surface 86'. Other geometrical outer surface configurations are also contemplated within the invention including triangular outer surface configurations, ovate outer surface configurations and square and rectangular outer surface configurations. While the extruded tube 80 is preferably extruded from an easily formed material such as aluminum it is recognized that the tube can be formed from other materials such as copper, steel or suitable plastics so long as desired heat transfer characteristics are present therein to allow heat flow from the coolant to prevent engine overheating and heat flow from the refrigerant gas to provide sufficient liquid condensation to supply the refrigerant capacity for cooling at the evaporator.

In the embodiment of FIG. 7, a plurality of baffles 112 are provided in the gas spaces 66, 66' of the condenser section 25 to cause the refrigerant to flow in a series, multi pass manner through the tube sections 80a–80d as shown by the flow arrows in FIG. 7.

Figure 8:
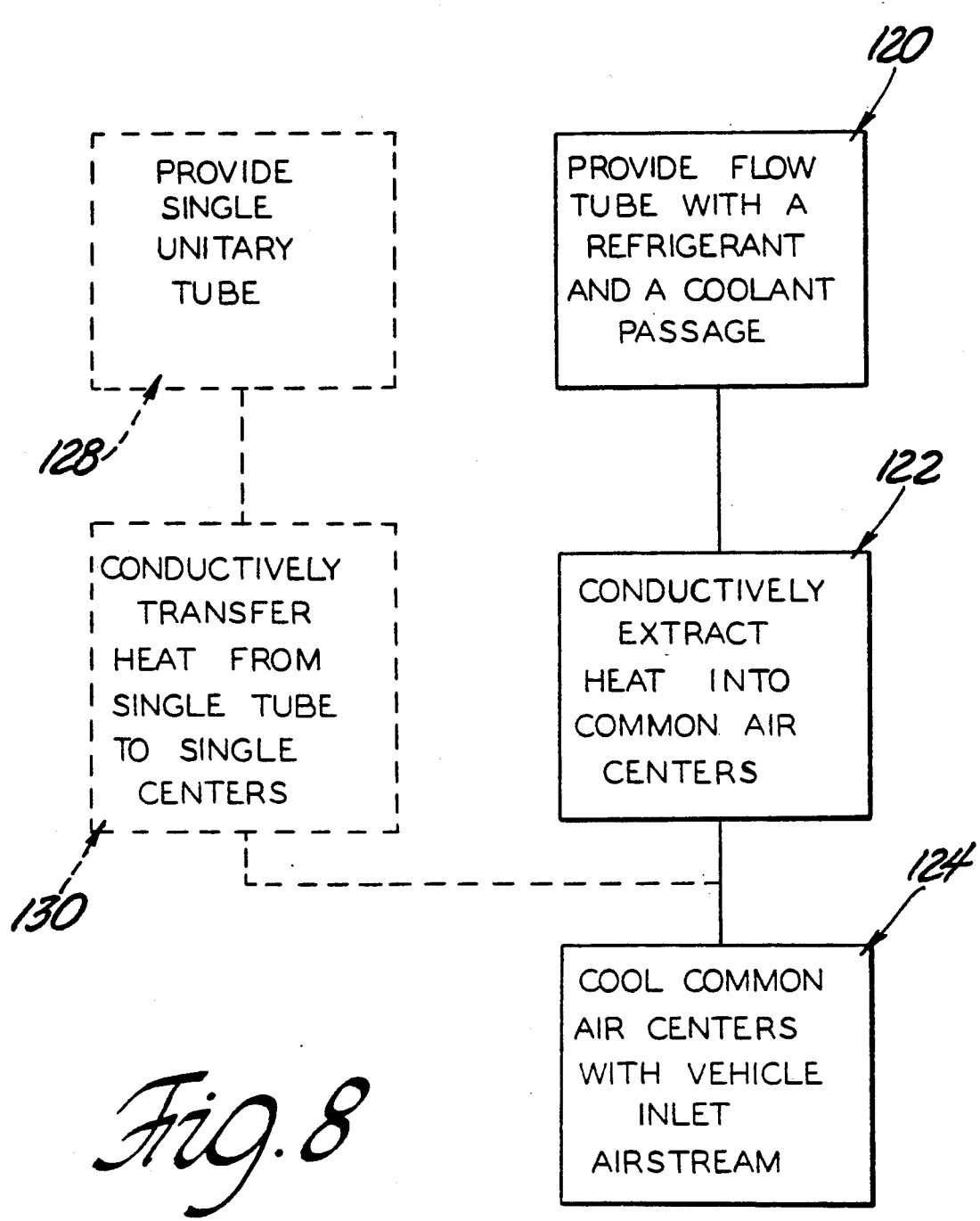
FIG. 8 is a flow chart of a method for cooling engine coolant and refrigerant vapor in a motor vehicle having an airconditioning system.

Referring now to the method flow chart of FIG. 8, in accordance with another aspect of the present invention an improved method is shown for cooling refrigerant vapor flow and engine coolant flow through parallel tube passes in a combined radiator and condenser apparatus for a motor vehicle. The method chart block 120 designates the step of providing tube passes with a refrigerant flow path and a coolant flow path therein; block 122 designates the step of conductively extracting heat simultaneously from the refrigerant flow path and the coolant flow path into a common air center element; and block 124 designates the step of removing the conductively extracted heat from the common air center element by directing the inlet air stream of the vehicle therethrough.

Another alternative step is designated by block 126 wherein the refrigerant flow path in the inlet air stream is provided upstream of the coolant flow path and in axial alignment therewith.

Still another alternative step is designated by block 128 wherein the refrigerant flow and coolant flow is provided in a single tube element and the conductively extracted heat (block 130) is by conductive heat transfer from the single tube element to a single air center element.

Having described preferred embodiments of the combination condenser and radiator assembly of the present invention according to the present invention and in a particularly useful application thereof, it will be understood by those skilled in the art that the desired application and embodiments are obtained by a very compact arrangement of a few easily assembled parts which enable a combination assembly to be used either for air conditioning or non air conditioning applications. In such preferred constructions there is basically one common tube member which serves to flow both coolant and refrigerant at the same time if desired. But it will be understood by those skilled in the art that the above-described preferred embodiments are illustrative of the invention and may be modified within the scope of the appended claims.

What is claimed is:

1. A method for cooling refrigerant vapor flow and engine coolant flow through parallel tube passes in a combined radiator and condenser apparatus cooled by the inlet airstream of a motor vehicle comprising the steps of:

providing a plurality of parallel tube passes each having a refrigerant flow path and a coolant flow path;

providing an air center element between said tube passes in common conductive heat transfer contact with both the refrigerant flow path and the coolant flow path and including an uninterrupted axial air passage therethrough in axial alignment with the inlet airstream;

conductively extracting heat simultaneously from the refrigerant flow path and the coolant flow path into the air center element which is located in common conductive heat transfer relationship with both the refrigerant flow path and the coolant flow path; and removing the conductively extracted heat from the air center element by directing the inlet air stream of the vehicle across the uninterrupted axial air passage in the air center element.

2. The method for cooling refrigerant vapor flow and engine coolant of claim 1 further comprising the step of providing a plurality of tube passes having a refrigerant flow path therein located in the inlet air stream at a point upstream of the coolant flow path and further providing the refrigerant flow path in axial alignment therewith so as to reduce pressure drop as the inlet air stream is directed across the plurality of parallel tube passes.

3. The method for cooling refrigerant vapor flow and engine coolant of claim 1 further comprising the step of locating he refrigerant flow path and the coolant flow path in a single tube element;
   providing an air center element and bonding it to the single tube element; and
   conductively extracting heat by conductive heat transfer form the single tube element to the air center element.

4. A method for cooling refrigerant vapor flow and engine coolant flow through parallel tube passes in a combined radiator and condenser apparatus cooled by the inlet airstream of a motor vehicle comprising the steps of:
   providing a plurality of parallel tubes each having a refrigerant flow path and a coolant flow path;
   providing an air center element between each of said tubes in common conductive heat transfer contact with both the refrigerant flow path and the coolant flow path;
   further providing each air center element with a plurality of spaced parallel uninterrupted axial air passages therethrough in axial alignment with the inlet airstream for directing the inlet airstream initially only across the refrigerant flow path followed by flow of the inlet airstream only across the coolant flow path;
   conductively extracting heat simultaneously from the refrigerant flow path and the coolant flow path into the air center element which is located in common conductive heat transfer relationship with both the refrigerant flow path and the coolant flow path; and
   removing the conductively extracted heat from the air center element by directing the inlet air stream of the vehicle across the plurality of spaced parallel uninterrupted axial air passages in the air center element.

* * * * *